United States Patent [19]

Dillarstone et al.

[11] 4,423,105
[45] Dec. 27, 1983

[54] ARTICLE FOR CLOTHES CONDITIONING AND METHOD OF MAKING SAME

[75] Inventors: Alan Dillarstone, Rocourt; Geneviève B. Delstanche, Loncin-Ans, both of Belgium

[73] Assignee: Colgate-Palmolive Company, New York, N.Y.

[21] Appl. No.: 404,025

[22] Filed: Aug. 2, 1982

[51] Int. Cl.³ .................. B32B 7/14; B32B 27/02; B32B 27/06
[52] U.S. Cl. ........................ 428/198; 34/9; 34/60; 156/291; 156/292; 156/308.4; 427/242; 428/286
[58] Field of Search ............. 427/242; 428/198, 286; 34/9, 60; 156/291, 292, 308.4

[56] References Cited

U.S. PATENT DOCUMENTS 3,049,466 8/1962 Erlich ..................... 428/198 X
3,795,571 3/1974 Prentice .................. 428/198 X
3,843,395 10/1974 Morton .................... 427/242
4,022,938 5/1977 Zaki et al. ................ 427/242
4,297,406 10/1981 Metcalfe et al. ........ 427/242 X Primary Examiner—Evan K. Lawrence
Attorney, Agent, or Firm—Norman Blumenkopf; Herbert S. Sylvester; Murray M. Grill

[57] ABSTRACT

A laundry conditioning product and method of making the product. The product employs a substrate of non-woven polypropylene or other polyolefin non-woven fabric having a water absorption capacity of less than 400%. The substrate is impregnated with a softening and conditioning composition including one of the di-long chain alkyl, di-short chain alkyl ammonium salts or cationic imidazolinium salts. The laundry conditioner works in a conventional dryer. The weight ratio of the clothes conditioner impregnating the fabric to the non-woven substrate is in the range of 2:1 to 0.5:1. The substrate is arranged in a butterfly configuration including a plurality of sheets bonded together along a substantially centrally located line with the edges of the sheets being free from each other.

10 Claims, 4 Drawing Figures

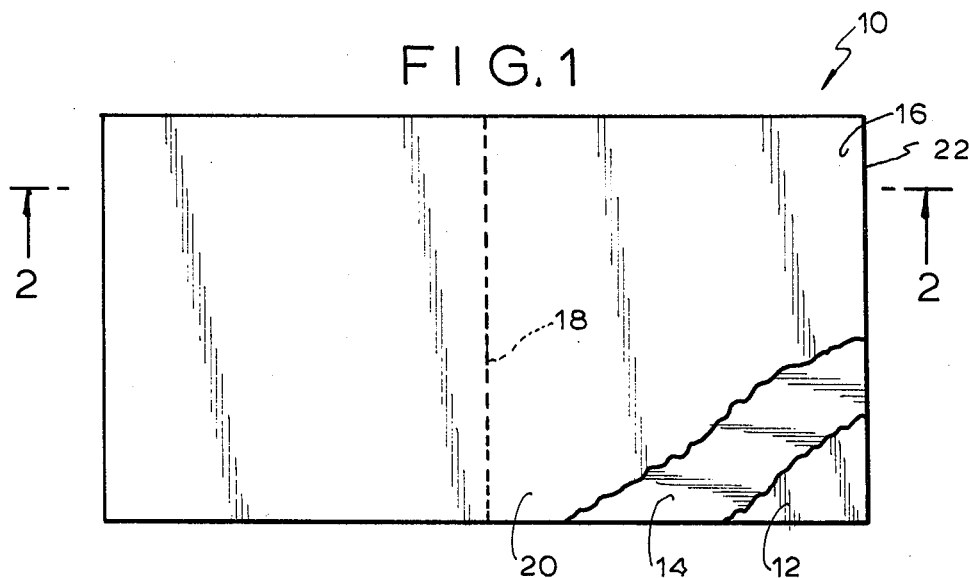
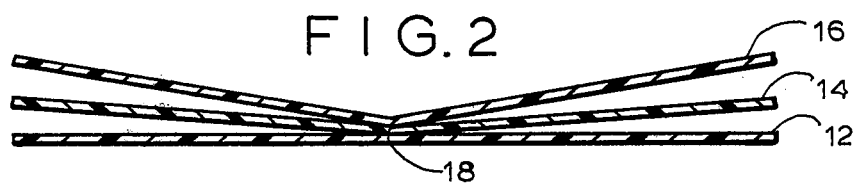
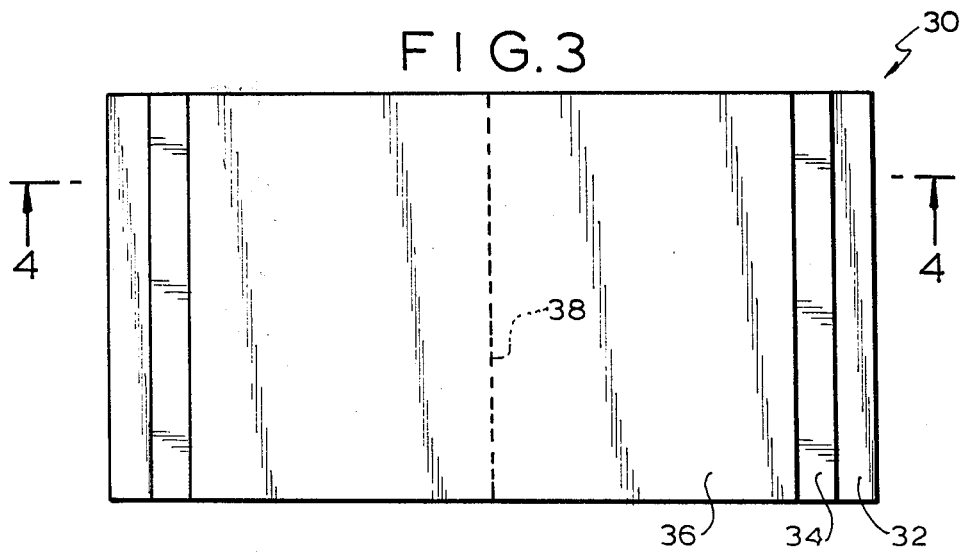
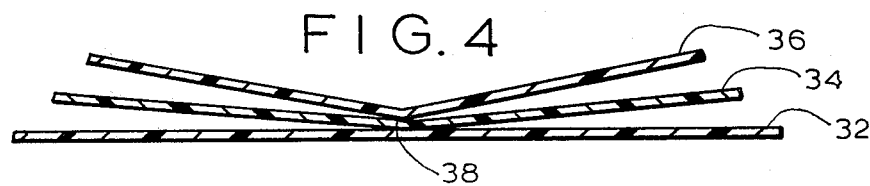

ARTICLE FOR CLOTHES CONDITIONING AND METHOD OF MAKING SAME

SUBJECT OF THE INVENTION

This invention relates to the conditioning of fibrous materials, such as laundry, in an automatic laundry dryer or similar machine, wherein the conditioning agent is carried by a low water absorbent, non-woven material made of polyolefin fibers, and preferably spun-bonded polypropylene.

BACKGROUND OF THE INVENTION

Field of the Invention

Various devices and compositions have been employed to condition fibers, fabrics, and laundry. Such conditioning may be effected with any of various suitable agents to improve a wide variety of properties of the materials treated. Generally, the most important conditioning effect is softening, especially with respect to cottons which have been laundered in aqueous solutions of heavy duty synthetic organic detergents. Also, and of increasing importance with the growing use of synthetic fabrics, the treatment of such fabrics and laundry material incorporating them has been desirable to diminish objectionable tendencies of such materials to become electrostatically charged, whereby they cling together or adhere closely and objectionably to various other surfaces. Of course, other conditioning may also be effected, such as making the treated articles antibacterial, soil-repellant, antifungal, perfumed, brightened, sized or lubricated. With respect to the various above treatments, especially with respect to softening fabrics and making them antistatic, the principal mechanisms employed in the past have relied on the substantivity of the treating material to the fabrics being treated. Thus, a treating chemical, dissolved in the last laundry rinse, becomes tightly held by the fabric and is not removed after discharge of the rinse water and subsequent drying. This, however, generally requires the presence of the launderer at the start of the last rinse to add the required material. Recently, such softening and/or antistatic agents have been applied to materials in conjunction with the drying operation. Thus, in U.S. Pat. No. 3,442,692, it is taught that various cationic conditioning agents can be used to impregnate flexible absorbent substrate materials, such as paper, cloth or sponge and can be vaporized from these as they are tumbled during a drying operation, so that they may be sorbed by the moving laundry present in the dryer. Paper-like substrates often adversely affect air flow by overlying vents or air holes. To this end, slits have been provided in the substrates as disclosed in U.S. Pat. No. 3,944,692. This may cause tearing of the substrate and adherence of smaller pieces thereof to the clothes being dried. Alternatively, the substrate has been mounted on a dryer door as disclosed in U.S. Pat. No. 4,053,992.

The use of absorbent material such as viscose is likely to cause a quantity of water to be absorbed not only increasing weight and product production time, but some loss of efficiency of the product.

SUMMARY OF THE INVENTION

It is, therefore, an object of the invention to provide a laundry conditioning product and method of making the same wherein the product has an increased surface area and will not block air passages.

A further object of the invention is to provide an assembly in butterfly configuration of non-woven sheets of hydrophobic material of low absorptive characteristics.

This is achieved by a laundry conditioning product comprising a substrate of a non-woven hydrophobic thermoplastic material, preferably a polyolefin and, more preferably polypropylene fibers, said substrate having a water absorption capacity of less than 400%. The substrate may be impregnated with any suitable composition but, preferably, for softening a di-long chain alkyl di-short chain alkyl ammonium salt or cationic imidazolinium salt or mixtures thereof are used. The weight of the clothes conditioning composition to the substrate is between 2:1 to 0.5:1. The substrate includes a plurality of sheets bonded together along a line to form a butterfly configuration with the edges of the sheets being free from each other. The sheets are preferably offset from each other and the bonding may be by adhesive (e.g., hot melt) or by heat sealing.

BRIEF DESCRIPTION OF THE DRAWING

FIG. 1 is a plan view of the product according to the invention with parts of upper sheets being broken away;

FIG. 2 is a sectional view taken along the plane of line 2—2 of FIG. 1;

FIG. 3 is a plan view of another embodiment of the invention; and,

FIG. 4 is a sectional view taken along the plane of line 4—4 in FIG. 3.

DETAILED DESCRIPTION OF THE INVENTION

With continuing reference to the accompanying drawing, a laundry conditioning product according to the invention is generally indicated by reference numeral 10. The product 10 includes a plurality of sheets 12, 14 and 16 which form the product substrate. The sheets 12, 14 and 16 are preferebly rectangular, but other suitable shapes may be employed, and are formed of a hydrophobic non-woven material such as a spun-bonded thermoplastic, preferably of polypropylene fibers. Other polyolefins such as polyethylene can be used.

The sheets 12, 14 and 16 are bonded together along a line 18 preferably centrally disposed between side edges 20, 22 of the product, but may be offset from the center, if desired.

In FIGS. 3 and 4 there is shown an alternative preferred embodiment of the product 30 wherein the sheets 32, 34 and 36 of non-woven polypropylene fibers are bonded to each other along a medially disposed line 38, and the sheets are offset from each other.

The bonding of the non-woven sheets of polypropylene fibers may be by a hot melt adhesive or by heat sealing.

The sheets 12, 14 and 16 as well as sheets 32, 34 and 36 form a butterfly configuration with the sheets extending from a central spine formed by the bonding of the sheets together and with the edges of the sheets being free from each other.

The substrate formed by the sheets of non-woven polypropylene has a water absorption capacity of less than 95% and preferably less than 400%, and may be made in an attractive easily noticeable color, such as blue or light blue with white lines. The absorbency is determined by immersing pre-weighed and conditioned (24 hours at 20° C., 68% relative humidity) samples in tap water at room temperature for 30 seconds and after removing and allowing excess water to drain for 15 seconds and noting weight gain. The percent absorbency is the increase in weight divided by the dry weight. The special butterfly configurations provide for increased surface area for clothes to contact and rub against, the sheets fluttering and parting like wings to rub against tumbling clothes. This construction and action also prevent closing or blocking of hot air or ventilating holes or ducts in the dryer.

The non-woven sheets may be impregnated with any laundry conditioning composition but of particular value is a spun-bonded, polypropylene-based structure impregnated with a softening and anti-stat formulation. The release of conditioner from the propylene sheets is about 75% (in use) whereas similar sheets of 100% viscose have a release factor of only 65%.

As pointed out above, any laundry conditioning composition is useable with the unique structure of the present invention but of particular interest and import are a fabric softening and/or anti-stat composition. Such compositions may be based on any of the conventional cationic softeners and anti-stats of the mono-long chain (e.g., $C_{12}$ to $C_{30}$), tri-short chain (e.g., $C_1$ to $C_4$), aliphatic (e.g., alkyl), ammonium salts (e.g., halide, sulfate, methosulfate, acetate, phosphate, etc.); di-long chain (e.g., $C_{12}$ to $C_{30}$), di-short chain (e.g., $C_1$ to $C_4$), aliphatic (e.g., alkyl), ammonium salts (e.g., halide such as chloride or bromide, sulfate, methosulfate, acetate, phosphate and the like); and cationic imidazolinium salts. Other non-ionic softeners including alkanolamides, tertiary amine oxides, tertiary phosphine oxides, ethoxylated alcohols and alkyl phenols as well as anionic softeners such as soaps, sulfates and sulfonates, zwitterionic quaternary ammonium compounds and ampholytic tertiary ammonium compounds along with compatible mixtures of one or more of the foregoing compounds and classes of compounds may also be used.

Specific compounds, all well known in the art may be found set out in U.S. Pat. No. 3,686,025, Column 6, line 69 to Column 13, line 3, and such disclosure is hereby incorporated by reference thereto.

The conditioning compositions, and particularly the fabric softening and anti-stat compositions, may be applied to the substrate in any suitable form. Thus, they may be applied as powders, liquids, and pastes, by, for example, spraying, impregnation of running lengths of substrate and nip-roll application of pastes and similar viscous forms of the compositions.

A particularly preferred composition is a fabric softening composition in paste form which is applied by conventional nip rollers to a running web of substrate material. A preferred method for preparing the unique product of this invention involves combining in overlying relationship several webs (preferably three but two or four or more may be used) which have been paste-impregnated by nip-roller application and sealing (18 of FIG. 1 and 38 of FIG. 3) to form a composite structure.

For the FIG. 1 embodiment the webs may conveniently be of any width and where the width is a multiple (e.g., 2X or 3X or 4X) of the final dimension, several parallel seals may be effected in the machine direction in a continuous manner and the web then cut, again in the machine direction first and then a final cut to produce the desired dimensions of the product. An exemplary dimension is 23 cm×28 cm with the seal for the sheets being approximately at the midpoint of the 28 cm dimension (i.e., about 14 cm from each edge). Typically, each sheet (using a spun-bonded polypropylene having a basis weight of 10 grams/square meter) would have a thickness before impregnation of 0.068 mm, a dry tensile strength in the machine direction of 550 g/25.4 mm and in the cross dirction of 470 g/25.4 mm, would contain about 1.5 grams of fabric conditioner composition for each 23 cm×28 cm sheet. To produce such a product one may use a web of 84 cm in width, apply three parallel seals with two of them spaced 14 cm from each edge of the web and the third seal in the middle of the web (i.e., 42 cm from the edges) and then cut the webs in the machine direction to the desired 28 cm dimension as the web moves along. The final step would be to cut the composite webs in the cross direction to the 23 cm dimension.

For the FIG. 3 embodiment separate impregnated webs of 28 cm in width are superimposed but offset and then sealed together.

In addition to the fabric softener component or components, the softener composition generally may contain perfume, color, brighteners, solvents (e.g., small amounts of water and lower alkanols such as ethyl and isopropyl alcohol), viscosity modifiers (e.g., electrolyte material such as sodium chloride-0.01 to 5%), release agents, fillers, and the like.

The following example will serve to illustrate the invention without being deemed limitative thereof. Parts are by weight unless otherwise indicated.

EXAMPLE 1

A substrate web, 28 cm in width, is run through nip rollers to impregnate same. The product is as follows:

|  | Parts by Weight |
|---|---|
| Substrate (spun-bonded polypropylene weight basis 10 g/meter | 55% |
| Distearyl Dimethyl Ammonium Chloride | 35.35% |
| Sodium Chloride | 0.08% |
| Ultramarine blue | 0.8% |
| Perfume | 0.8% |
| $H_2O$ | Q.S. |

Sheets are cut to 23 cm×28 cm dimensions. Three sheets are plied together with their edges offset ¼ inch and hot melt sealed with a thermoplastic polyolefin containing aliphatic hydrocarbon resin. The adhesive is 5 mm in width and extends from edge to edge (23 cm).

EXAMPLE 2

Example 1 is repeated with a variation of the formulation to give the following:

|  | Parts by Weight |
|---|---|
| Substrate | 55% |
| Distearyl Dimethyl Ammonium Chloride | 24.69% |
| Ditallow Methyl Isopropyl Ammonium Chloride | 10.66% |
| Sodium Chloride | 0.08% |
| Ultramarine Blue | 0.8% |
| Perfume | 0.8% |
| $H_2O$ | Q.S. |

EXAMPLE 3

Sheets of the following composition are produced.

|  | Parts by Weight |
|---|---|
| Substrate (as in Example 1) | 55% |

| | Parts by Weight |
|---|---|
| Distearyl Dimethyl Ammonium Chloride | 24.69% |
| 2-Heptadecyl-1, 1 Methyl (2-Stearoylamido) Ethyl Imidazolinium Methosulfate | 10.66% |
| MaCl | 0.08% |
| Ultramarine Blue | 0.8% |
| Perfume | 0.8% |
| $H_2O$ | Q.S. |

The foregoing sheets are prepared by nip-roll impregnating a polypropylene web of 84 cm in width with a paste of the impregnant. The web is cut into three webs of 28 cm width each and superimposed to give a three-ply structure. The continuous running three-ply web is heat sealed in the middle—in the machine direction. The web is then cut into 23 cm units to give three-ply composites of 23 cm × 28 cm each.

As a general guide and within the parameters set out previously, the substrate may comprise on a weight basis from about ⅓ to ⅔ of the final product and the conditioner also about ⅓ to ⅔ of the final article. As indicated, minor amounts of various non-softening, non-anti-stat components may also be incorporated in the final product generally by combining same with the conditioner but such other adjuvants may be added prior to treatment with the conditioner or by post treatment.

What is claimed is:

1. A laundry conditioning product comprising a substrate of a non-woven hydrophobic thermoplastic having a water absorption capacity of less than 400% and being impregnated with a clothes conditioning composition, there being a weight ratio of conditioning composition to substrate of between 2:1 to 0.5:1, said substrate including a plurality of sheets arranged in a butterfly configuration with the edges thereof being free from each other, said sheets being bonded to each other along a substantially centrally located line forming a spine for said butterfly configuration of sheets.

2. A product according to claim 1, wherein said sheets are offset from each other.

3. A product according to claim 1, wherein said sheets are bonded together along a line equally spaced from two parallel edges of each of said sheets.

4. A product according to claim 1, wherein said clothes conditioning composition comprises mainly a dialkyl dimethyl ammonium chloride.

5. A product according to claim 1, wherein said composition comprises mainly a cationic imidazolinium salt.

6. A laundry conditioning product comprising a substrate of a non-woven hydrophobic thermoplastic having a water absorption capacity of less than 400% and being impregnated with a clothes conditioning composition, there being a weight ratio of conditioning composition to substrate of between 2:1 to 0.5:1, said substrate including a plurality of sheets arranged in a butterfly configuration with the edges thereof being free from each other, said sheets being bonded to each other along a substantially centrally located line forming a spine for said butterfly configuration of sheets, said sheets being offset from each other, said substrate being of spun-bonded polypropylene fibers and comprising about 55% of the weight of the product, said composition comprising about 35% of the product and comprising a mixture of distearyl dimethyl ammonium chloride and ditallow methyl isopropyl ammonium chloride.

7. A product according to claim 6, wherein said sheets are bonded by a hot melt adhesive.

8. A product according to claim 6, wherein said sheets are bonded by being heat sealed.

9. A method for making the product of claim 1, which comprises impregnating the substrate sheets with a paste of the conditioning composition, assembling a plurality of said sheets into a butterfly configuration, and bonding the assembly in a unitary structure along a substantially centrally located spine.

10. A method according to claim 9, wherein said sheets are assembled in offset relationship.

* * * * *